US011129695B2

(12) United States Patent
Benarouch et al.

(10) Patent No.: US 11,129,695 B2
(45) Date of Patent: Sep. 28, 2021

(54) ORTHODONTIC APPLIANCE

(71) Applicant: D&D, Paris (FR)

(72) Inventors: Dan Benarouch, Paris (FR); Delphine Majbruch, Paris (FR); Skylar Tibbits, Boston, MA (US)

(73) Assignee: D&D, Paris (FR)

( * ) Notice: Subject to any disclaimer, the term of this patent is extended or adjusted under 35 U.S.C. 154(b) by 0 days.

(21) Appl. No.: 15/551,137

(22) PCT Filed: Feb. 16, 2016

(86) PCT No.: PCT/EP2016/053269
§ 371 (c)(1),
(2) Date: Aug. 15, 2017

(87) PCT Pub. No.: WO2016/131827
PCT Pub. Date: Aug. 25, 2016

(65) Prior Publication Data
US 2018/0021107 A1 Jan. 25, 2018

(30) Foreign Application Priority Data

Feb. 16, 2015 (FR) ..................................... 1551287

(51) Int. Cl.
*A61C 7/08* (2006.01)
*A61C 7/00* (2006.01)
(Continued)

(52) U.S. Cl.
CPC .................. *A61C 7/08* (2013.01); *A61C 7/00* (2013.01); *A61C 7/002* (2013.01); *A61C 7/10* (2013.01);
(Continued)

(58) Field of Classification Search
CPC .... A61C 7/08; A61C 7/00; A61C 7/10; A61C 7/14; A61C 7/12; A61C 7/36; A61C 5/007; A61C 5/30; A61C 7/20; A61C 7/28
See application file for complete search history.

(56) References Cited

U.S. PATENT DOCUMENTS 6,183,248 B1 * 2/2001 Chishti .................... A61C 7/00
433/6
2003/0055198 A1 * 3/2003 Langer .................. B29C 61/003
528/80
(Continued)

FOREIGN PATENT DOCUMENTS

FR 2952803 A1 5/2011
JP H08280711 A 10/1996
(Continued)

OTHER PUBLICATIONS

International Search Report for PCT/EP2016/053269 dated May 3, 2016 (3 pages).
(Continued)

*Primary Examiner* — Edward Moran
(74) *Attorney, Agent, or Firm* — Shumaker, Loop & Kendrick, LLP

(57) ABSTRACT

Disclosed is a method for producing an orthodontic appliance for securing to a user's teeth in order to carry out an orthodontic treatment, the appliance having an element. The method includes a) gathering information relating to the user's set of teeth; b) using the information to determine at least first and second stable shapes of the element towards which the element should tend to deform during the first and second periods of treatment, respectively; and c) producing and programming the element in such a way that the application of a stimulus during the first period of the treatment renders the second stable shape operational. In
(Continued)

certain aspects in step c), a retractable or expansible material is incorporated into the element.

25 Claims, 2 Drawing Sheets

(51) Int. Cl.
  *A61C 7/20* (2006.01)
  *A61C 7/10* (2006.01)
  *A61C 7/14* (2006.01)
  *A61C 13/00* (2006.01)
(52) U.S. Cl.
  CPC .................. *A61C 7/14* (2013.01); *A61C 7/20* (2013.01); *A61C 13/0013* (2013.01); *A61C 2201/007* (2013.01)

(56) References Cited

U.S. PATENT DOCUMENTS

| | | | |
|---|---|---|---|
| 2003/0157454 A1 | 8/2003 | Hansen et al. | |
| 2004/0103905 A1* | 6/2004 | Farrell | A61C 7/08 128/861 |
| 2004/0209218 A1* | 10/2004 | Chishti | A61C 7/36 433/6 |
| 2005/0003318 A1* | 1/2005 | Choi | A61C 7/08 433/6 |
| 2005/0277084 A1* | 12/2005 | Cinader | A61C 7/20 433/20 |
| 2006/0099544 A1* | 5/2006 | Lai | A61C 7/20 433/6 |
| 2006/0154195 A1 | 7/2006 | Mather et al. | |
| 2007/0065768 A1 | 3/2007 | Nadav | |
| 2009/0246724 A1 | 10/2009 | Chen et al. | |
| 2011/0007920 A1 | 1/2011 | Abolfathi et al. | |
| 2014/0302448 A1 | 10/2014 | Cassalia | |

FOREIGN PATENT DOCUMENTS

| | | |
|---|---|---|
| WO | 200205731 A1 | 1/2002 |
| WO | 2013121316 A1 | 8/2013 |

OTHER PUBLICATIONS

Written Opinion for PCT/EP2016/053269 dated May 3, 2016 (6 pages).

* cited by examiner

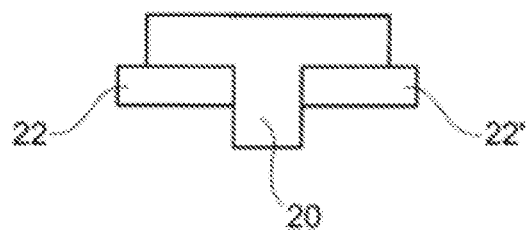
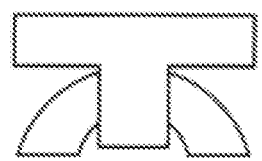
Fig. 1a        Fig. 1b
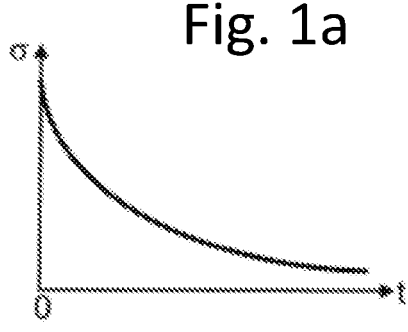
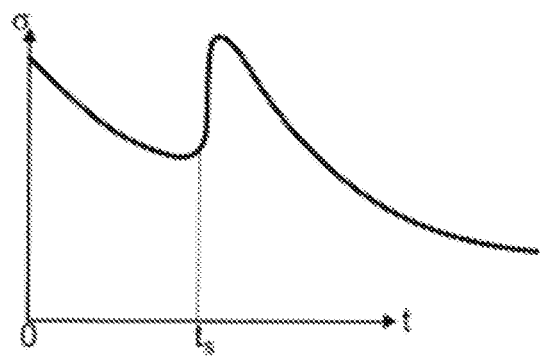
Fig. 2a
Fig. 2b
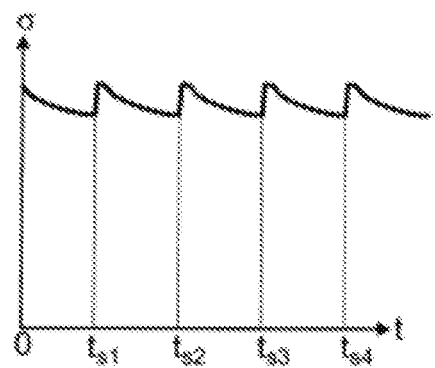
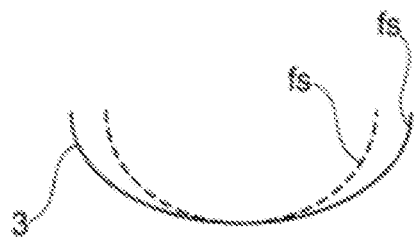
Fig. 2c
Fig. 3
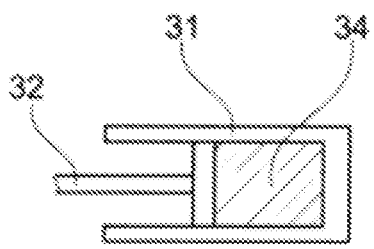
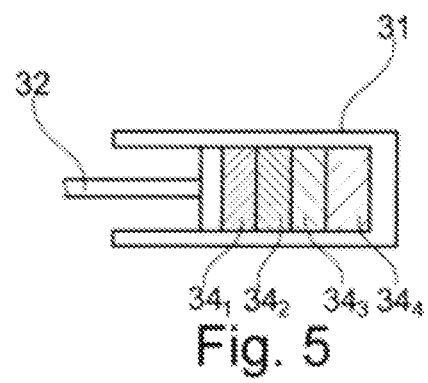
Fig. 4
Fig. 5

ORTHODONTIC APPLIANCE

CROSS REFERENCE TO RELATED APPLICATION(S)

This Application is a National Stage Application claiming priority from PCT/RP2016/053269 filed Feb. 16, 2016, which claims priority from FR 1551287 filed Feb. 16, 2015.

BACKGROUND AND TECHNICAL FIELD

The present invention relates to an orthodontic appliance, in particular an "active" orthodontic appliance, that is to say one that is able to deliver a force in order to move the teeth from an initial position, corresponding to a "malposition", to a final position, or a "passive" orthodontic appliance, that is to say one intended to hold the teeth in position in order to prevent these teeth from moving towards a malposition.

The category of "active" orthodontic appliances also includes appliances that are selectively active, that is to say appliances which may be kept in the patient's mouth after an orthodontic treatment and may be activated in the case of a recurrence.

The invention also relates to a method for producing such an appliance.

The invention also relates to a method of treatment by means of such an appliance.

An active orthodontic appliance traditionally has a plurality of brackets that are intended to be fixed to a user's teeth, and an archwire that is intended to be fixed temporarily to said brackets.

Traditionally, the archwire has to be changed regularly and replaced by another archwire of larger cross section or made of another alloy.

Alternatively, an active orthodontic appliance may be composed of an active orthodontic aligner. Invisalign® is an example of an active aligner consisting of a piece of transparent plastic having the general shape of a gutter, with tooth impressions corresponding to a final positioning of a set of teeth of a user. The user wears the active aligner on his or her teeth, and the elasticity of the material of the active aligner forces these teeth towards the final positioning. Traditionally, the final positioning corresponds to a movement of the teeth of about 0.25 mm, which normally involves the aligner being changed every two or three weeks. The transparency of the active aligner makes it largely invisible.

The aligner is placed on the user's teeth and may be removed when desired by the user. Regardless of whether the active orthodontic appliance has brackets or is an active aligner, the force exerted on the teeth is at its greatest when the appliance is fitted, and it then decreases over time (see FIG. 2a). After a few days (active aligners), weeks or months, the efficacy of the appliance becomes poor and, if the desired positioning has not been reached, the archwire or the active aligner has to be replaced.

A high degree of initial elasticity makes it possible to extend the useful life of an archwire or of an active aligner and thus to limit the number of visits to the orthodontist. However, a high degree of elasticity may sometimes reduce the efficacy of the appliance.

Moreover, an archwire or an active aligner loses its efficacy at the end of its lifetime and then has to be quickly replaced.

A removable expansion appliance or "palatal expansion plate" is an active orthodontic appliance whose geometry may be modified by means of a screw, making it possible to move different parts of the appliance relative to one another.

During the treatment, the geometry of the appliance has to be traditionally modified on several occasions, which necessitates as many interventions by the user or the orthodontist. In addition, the actuation of a screw may be awkward, which increases the risk of poor compliance with the recommendations made by the orthodontist. Finally, the possible geometries for the appliance are not predetermined. The determination of a new geometry thus requires the expertise of an orthodontist.

There is a need for an orthodontic appliance making it possible to simplify treatment and in particular to limit the visits to the orthodontist.

An object of the present invention is to meet this need at least in part.

SUMMARY OF THE INVENTION

To this end, the invention proposes an orthodontic appliance intended to be secured to a user's teeth, for example by matching the shape of said teeth, for example an active aligner, or by way of a plurality of brackets, after said brackets have been fixed to said teeth.

According to the invention, the appliance comprises a monobloc element (hereafter "the element"), preferably a monobloc element, which is programmed to deform, by application of a predetermined stimulus, from a first stable shape to a second stable shape. The first and second stable shapes may correspond to predetermined positions of the teeth, for example an intermediate position and a final position of the teeth.

As will be seen in more detail in the description below, an appliance according to the invention makes it possible, optionally without the help of an orthodontist, to easily and precisely control the force exerted by the appliance on the teeth that are to be treated. In addition, the variation in the force over the course of time may be reduced. The efficacy of the appliance may, for example, remain more or less constant, and the duration of the treatment may be shorter.

Preferably, the element has or even consists of a material that is retractable or expansible under the effect of the stimulus, preferably a polymer material and/or a hydrogel.

Preferably, the change of volume of the element under the effect of the stimulus is greater than 1%, 2%, 5%, 8%, 10%, 20%, 50%, 80%, 100%, 120%, 140% or even 150% of the initial volume, after application of the stimulus.

The element may be designed to deform gradually or instantly under the effect of the stimulus.

More preferably, the stimulus applied to the element is chosen from the group including radiation, in particular light, infrared, ultraviolet or sound radiation, a modification of the humidity and/or of the acidity and/or of the temperature and/or of the chemical composition of the environment of the element, application of an electric current and/or of an electric voltage and/or of a magnetic field, a force, such as a masticatory force, and combinations thereof.

In one embodiment, the stimulus is applied for a period of less than 1 hour, 30 minutes, 60 seconds, 30 seconds, 10 seconds, 5 seconds or 1 second.

In one embodiment, the element is designed in such a way that its deformation for attaining the second stable shape continues after the application of said stimulus. For example, the orthodontist or the user applies the stimulus for a few seconds, which initiates the deformation. The deformation then continues until the second stable position. Preferably, after application of the stimulus and in the absence of force, the element has a shape that varies for a period of more than 1 day, 30 days or even 60 days, before attaining the second stable shape.

Preferably, the element is arranged in such a way that it is able to be rendered operational by the stimulus when the appliance is in the position of use in the user's mouth. The orthodontist or the user may thus modify the functioning of the appliance without needing to remove it from the mouth.

More preferably, the stimulus is applied without contact with the element. The risk of injury is thereby reduced.

An appliance according to the invention may also have one or more of the following optional features, and in all the possible combinations:
- the element is made of a biocompatible material;
- in the second stable shape, the element has at least one dimension that is more than 1% greater, more than 3% greater, more than 5% greater or more than 10% greater than the dimension it has in the first stable shape;
- the element is designed in such a way that the change from the first stable shape to the second stable shape is irreversible;
- the element is programmed to be configurable in more than 2, more than 5 or more than 10 predetermined stable shapes, the change from one stable shape to another resulting from the application of a said stimulus that is identical to or different than that required to change from the first to the second stable shape;
- a stable shape corresponds to an actual or desired position of the teeth;
- the element is in the form of an active aligner;
- the element is in the form of a block of expansible or retractable material, for example arranged in the chamber of a jack;
- the element is in the form of an archwire with a structure, for example a number of strands and/or a chemical composition and/or a profile, variable along its length;
- the element is in the form of an archwire comprising several strands and/or several layers and/or several longitudinal portions, which may each adopt several configurations under the effect of the application of a said stimulus;
- the element has, along its length, a variable composition and/or transverse profile and/or has, in cross section, a heterogeneous composition and/or structure and/or has, along its length, a variable number of strands and/or strands having, along their lengths, a variable composition and/or transverse profile and/or having, in cross section, a heterogeneous composition and/or structure;
- the element is made of a material that does not have shape memory;
- the element is designed and produced with the aid of a computer;
- the element, preferably the appliance, is produced by 3D printing.

In the preferred embodiment, the orthodontic appliance comprises a structure, and in particular a composite, i.e. multi-material, preferably printed structure, which can autonomously transform over the course of days, weeks and months, precisely moving teeth into the desired placement.

In particular, the invention concerns an orthodontic appliance intended to be secured to a user's teeth, the appliance comprising an element, preferably a monobloc element, comprising a first region in a first material, the first material being chosen so as to expand or refract, preferably expand when it is in contact with a liquid, from a first stable shape to a second stable shape.

The stimulus is therefore the contact with the liquid. Preferably, the liquid is an aqueous liquid, preferably saliva.

When the appliance is in the mouth, the first material will therefore expand. Advantageously, this expansion may then be used to exert an action on the teeth.

The first material is preferably chosen so as to expand or retract during a period greater than 1 week, preferably greater than 2 weeks, preferably greater than 4 weeks, preferably greater than 8 weeks, preferably greater than 12 weeks. The action on the teeth can therefore be exerted, and preferably modulated for a long time. The efficiency and the comfort for the user are thereby improved.

The first material is not gaseous. It is preferably a solid, or a paste or a gel.

The first material is preferably a hydrogel.

The element preferably comprises a second region in a second material, the second material being preferably chosen so as to expand or refract, preferably expand less than the first material, when it is in contact with said liquid.

This element may then be called a "composite element".

The second material is preferably substantially rigid.

The second region is preferably arranged so that the expansion or refraction, preferably the expansion of the first material be hindered by the second material. The second material may advantageously be used to control the expansion or retraction of the first material, so that the action of the appliance corresponds to an action adapted for an active orthodontic treatment.

The arrangement of the first and second regions are preferably determined, preferably with a software tool, depending on the actions requested for an orthodontic treatment of the teeth of the user. The invention also concerns such a software tool.

The software tool preferably uses information relating to the positioning of said teeth of the user and/or information relating to the behaviour of the first and second regions when they are placed in a mouth.

The second material is preferably a polymer, preferably a resin, or a metal.

In the preferred embodiment, the second region is in contact with the first region.

The composite element preferably comprises a bonding surface defined in the second region. Preferably all the bonding surfaces are defined in second regions made of said second material. Preferably, no bonding region is defined by a first region.

The first region is preferably located so as to extend, in a service position, between two adjacent teeth, i.e. so as to push or pull on the interface between said adjacent teeth.

Preferably, a bonding surface, preferably each bonding surface has an area greater than 1 mm$^2$, preferably greater than 2 mm$^2$, preferably greater than 3 mm$^2$, and/or less than 10 mm$^2$.

Each bonding surface preferably matches the surface of a tooth on which it is intended to be fixed in the service position.

The first region and/or the second region may be in the form of layers, preferably lying on on the other. The interface between said layers is preferably a plane or a plane curved around one axis, i.e., in a transversal cross-section, the interface defines a curve.

The thickness of the first and/or second layer is preferably less than 5 mm, preferably less than 4 mm, preferably less than 3 mm, preferably less than 2 mm, preferably less than 1 mm, preferably less than 0.5 mm.

The width of the first and/or second layer is preferably less than 5 mm, preferably less than 3 mm, and preferably less than 2 mm.

The length of the first and/or second layer is preferably less than 40 mm, preferably less than 30 mm, preferably less than 20 mm, preferably less than 15 mm, even less than 10 mm.

The element preferably has the shape of a staple. Preferably said staple has the general shape of a "U", with a base and two branches, preferably substantially parallel, extending from said base, on the same side of the base. The ends of this staple are intended to be fixed on teeth of the user, for instance with a glue conventionally used to fix the brackets for archwires. To increase the retention of the glue on the element, the bonding surfaces have preferably reliefs and/or are treated by sandblasting.

Before being used, the element has:
- a thickness preferably less than 2 mm, preferably less than 1.7 mm, and/or greater than 0.5 mm, preferably greater than 1.0 mm, preferably greater than 1.5 mm; and/or
- a width preferably less than 7.0 mm, preferably less than 5.0 mm, preferably less than 4.0 mm, and/or greater than 1.0 mm, preferably greater than 2.0 mm, preferably greater than 2.5 mm; and/or
- a length preferably less than 7.0 mm, preferably less than 5.0 mm, preferably less than 4.0 mm, and/or greater than 1.0 mm, preferably greater than 2.0 mm, preferably greater than 2.5 mm.

In an embodiment, the appliance, or the element, has the general shape of an arch designed to be fixed on more than 2, more than 3, more than 4 teeth.

The invention also relates to a method for producing an appliance according to the invention comprising an element, preferably a monobloc element, and intended to be fixed to a set of teeth of a user, said method having the following steps:
a) gathering information relating to said set of teeth, and in particular information relating to the positioning of said teeth;
b) using said information to determine at least first and second stable shapes of said element towards which the element should tend to deform during first and second periods of the treatment, respectively, the stable shape towards which said element tends to deform at a given time being called "operational";
c) producing and programming said element in such a way that the application of a stimulus during the first period of the treatment renders said second stable shape operational.

Such a method advantageously permits an individually tailored treatment, preferably by exerting a force that is substantially continuous until the completion of the treatment. The stable shapes depend on the treatment that is to be applied.

In the case of an active orthodontic treatment, the element may in particular be programmed such that, after the element has been fixed to said teeth, the shape of the element tends, at the moment when all the teeth have the initial positioning, towards a target shape that corresponds to the first stable shape and, at the moment when all the teeth have an intermediate positioning after application of the stimulus, towards a target shape that corresponds to the second stable shape.

The second stable shape may, for example, correspond to the desired final positioning of the teeth.

The stable shapes are determined in such a way that the appliance exerts a predetermined force on all the teeth.

A method according to the invention may also include one or more of the following optional features, and in all the possible combinations:

in step c), a material that is retractable or expansible under the effect of the stimulus is incorporated into the element;

in step c), a material that is deformable under the effect of a stimulus is incorporated into the element, said stimulus being chosen from the group including a mechanical force applied by contact, a vibration, radiation, in particular light, infrared, ultraviolet or sound radiation, a modification of the humidity and/or of the acidity and/or of the temperature and/or of the chemical composition of the environment of the element, application of an electric current and/or of an electric voltage and/or of a magnetic field, and combinations thereof;

in step c), there is incorporated into the element a material that is deformable under the effect of a stimulus, the effect of which stimulus on said element is not modified when its intensity and/or duration exceeds a threshold;

in step c), there is incorporated into the element a material that is deformable under the effect of a stimulus, its deformation continuing, after cessation of said stimulus, for a period of more than 1 day, 30 days or even 60 days;

in step c), there is incorporated into the element a material that is deformable under the effect of a stimulus that may be applied without contact;

in step c), there is incorporated into the element a material that is deformable in more than 2, more than 5 or more than 10 stable shapes under the effect of said stimuli;

the element is in the form of an active aligner or of an orthodontic archwire or of a jack containing expansible or retractable material;

in step c), the element, or the appliance, is produced by 3D printing.

A method according to the invention may in particular be applied with an element providing an infinite number of stable positions, and in particular with a composite element, as disclosed previously.

This method may comprise the following successive steps:
a') gathering information relating to the user's set of teeth, and in particular information relating to the positioning of said teeth;
b') using said information to determine an orthodontic treatment for the patient, corresponding actions to be applied by said appliance, corresponding stable shapes for said element, and corresponding moments to apply said stable shapes;
c') producing and programming said element in such a way that, in the environment of the user's mouth, the element presents said stable shapes at said corresponding moments.

Steps a'), b') and c') may have one or several of the optional features of steps a), b) and c), respectively.

In the preferred embodiment, the element comprises a first region, preferably in a hydrogel, which deforms itself continuously, and preferably expand, for a period greater than 1 week, preferably greater than 2 weeks, preferably greater than 4 weeks, preferably greater than 8 weeks, preferably greater than 12 weeks, due to a contact with an aqueous liquid, and in particular with saliva.

In one embodiment, if the element is expanding when the stimulus is applied, is stops its expansion, or even retracts, if the stimulus (in particular the contact with the aqueous liquid) ceases. Conversely, in one embodiment, if the element is retracting when the stimulus is applied, is stops its retraction, or even expands, if the stimulus ceases. Preferably, the element may only expand, or only retract, i.e. its volume may only be one-way modified. In particular, if the element is expanding when the stimulus is applied, it will not retract if the stimulus ceases. Conversely, if the element is retracting when the stimulus is applied, it will not expand, if the stimulus ceases.

Preferably, said deformation leads to shapes which are all stable, i.e. which do not change if the stimulus (the contact with the aqueous liquid) ceases. The element preferably deforms itself continuously, under the sole effect of the contact with saliva, each of its shapes being stable.

The programming of the element then includes the determination of the locations and of the shapes of the first region(s), so that the shape of the appliance at a moment during the treatment produces the desired actions on the teeth at this moment.

The invention also relates to an appliance produced by a method according to the invention.

The invention relates finally to a method for active or passive orthodontic treatment, in particular for therapeutic and/or non-therapeutic purposes, and in particular for exclusively cosmetic purposes, in which method an appliance according to the invention is applied, in particular an orthodontic appliance with brackets according to the invention is fixed in place, or an active aligner according to the invention is fitted on the teeth of a user.

BRIEF DESCRIPTION OF THE FIGURES

Other features and advantages of the invention will become clearer on reading the following detailed description and on studying the attached drawing, in which:

FIG. 1a shows an initial stable shape of an element that may be used in an appliance according to the invention;

FIG. 1b shows a change in the stable shape of the element in an appliance according to the invention;

FIG. 2a illustrates a profile showing, as a function of time t, a force σ applied to the teeth by means of different elements;

FIG. 2b illustrates a profile showing, as a function of time t, a force σ applied to the teeth by means of different elements;

FIG. 2c illustrates a profile showing, as a function of time t, a force σ applied to the teeth by means of different elements;

FIG. 3 shows, in a highly schematic view from above, an element in the form of an archwire, which may have two stable shapes;

FIGS. 4 and 5 are schematic views, in medial longitudinal section, of the jack crews that may be used in an appliance according to the invention;

In the various figures, identical reference signs have been used to designate identical or similar elements.

DEFINITIONS

Figure 6:
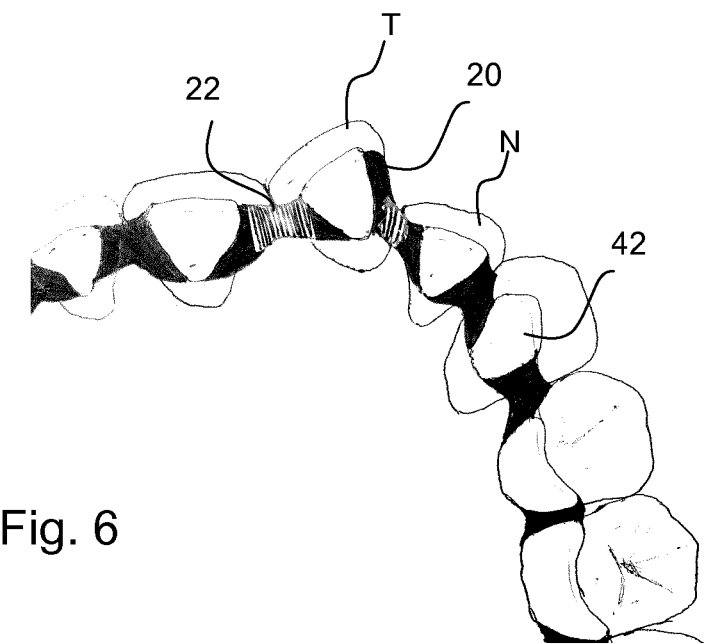
FIGS. 6 and 7 illustrate preferred embodiments of an appliance according to the invention.

The term "stable shape" designates the shape towards which, at a given time, the element tends to deform. In a preferred embodiment, the element tends to be returned to a stable shape elastically when it is moved away from it, in the manner of a spring. To observe a stable shape, the element must not be stressed (other than by the corresponding forces of gravity and reaction). During an active orthodontic treatment, the stable shapes constitute "target shapes" towards which the element tends to be returned, thereby causing the movement of the teeth.

The "programming" of the element signifies that the first and second stable shapes are predetermined depending on the intended use of the appliance. They are "inscribed" in the element, such that the user or the orthodontist simply has to apply the stimulus so that the element, initially in the first stable shape, deforms towards the second stable position. The stable shape towards which the element tends to be returned is called "operational".

The term "monobloc element" is understood as meaning that the element is composed of a single part or of a plurality of parts that are immobilized with respect to one another. Therefore, an element composed of a non-deformable support and of a screw screwed into a thread of the support, and of which the position may be modified, is not a "monobloc element";

The "application" of a stimulus to an element conventionally means that the element receives the stimulus. For instance, if an electrical signal controls an actuator which mechanically acts on an element, the stimulus is the mechanical action, not the electrical signal.

"expansible" and "retractable" materials conventionally designate materials which volume may increase or decrease, respectively. Likewise, "expand" means to increase in volume, and "retract" means to decrease in volume. The volume of an inflatable balloon increases when it is inflated, but not the volume of the material constituting the balloon.

The terms "having a" or "comprising a" are understood as meaning "having at least one" unless otherwise indicated.

"Force applied to the teeth" signifies all of the actions exerted on the teeth by the appliance.

DETAILED DESCRIPTION

An appliance according to the invention may be an active or passive orthodontic appliance, in particular an orthodontic appliance with brackets or an active aligner.

In particular, the appliance may be chosen from among an orthodontic appliance with brackets, called a "fixed" appliance because it may not be removed by the user and thus remains fixed to the user's teeth between visits to the orthodontist, and an orthodontic appliance referred to as "removable" because it may be removed by the user, in particular a palatal plate or an active aligner.

The appliance may be chosen from the group including removable expansion appliances, such as the Schwarz appliance, the Split Plate, fan-type expansion appliances, functional appliances for forward movement of the lower jaw, such as the Bionator, the Twin Block invented by William Clark, nocturnal lingual envelopes, aligners, retainers such as the Hawley retainer, of the standard type, the "wrap around" type or the "positioned" type, orthoses for forward movement of the lower jaw, such as the Morphée or the Orthosomamo, passive retainers, and auxiliary appliances for orthodontic treatment, such as positioning guides with mini-screws for orthodontic anchoring or surgical guides for placement of implants.

Two particular embodiments are described below, namely an appliance with brackets and an active aligner.

Appliance with Brackets

Traditionally, an active orthodontic appliance with brackets has a plurality of brackets and an archwire. In one embodiment, the archwire constitutes the programmed monobloc element.

The archwire is designed to be fixed to the brackets after said brackets have been fixed to a user's teeth, so as to force the teeth towards a desired position.

The brackets may be brackets currently used in orthodontics.

Preferably, the brackets are designed to permit replacement and/or adjustment of the element without damaging the brackets.

They may be made of any material, in particular a metal alloy or a ceramic material. All the brackets may be made of one and the same material.

Each bracket has a base with a pressure surface intended to be fixed rigidly to an inner or outer face of a user's tooth, preferably throughout the treatment, even in the retention phase, by means of a film of adhesive or of resin. The maximum thickness of the film is preferably less than 0.5 mm and greater than 0.2 mm.

Traditionally, a bracket also has fixing means for temporarily fixing the archwire. These fixing means may be incorporated in the bracket (for example for brackets referred to as "self-ligating") or may be composed of a ligature that is made either of metal or of elastomer. This fixing may in particular be obtained by clamping, for example by deformation of the bracket. The fixing means traditionally protrude from the base. Preferably, the brackets permit the adjustment and/or the replacement of the archwire during the treatment.

The archwire may have a cross section with a diameter of between 0.12 and 0.20 inch for round cross sections and with a side length of between 0.16 and 0.25 inch for square or rectangular cross sections. The archwire preferably has a round, square or rectangular cross section. It is preferably made of metal, generally of nickel titanium, steel or an alloy of titanium and molybdenum (TMA).

The archwire may be single-stranded or have a plurality of strands, which are preferably twisted, preferably more than five and fewer than ten strands. A bundle of six to nine strands is suitable.

The archwire typically has a length of less than 100 mm and of more than 20 mm. The archwire is elastic and is designed in such a way that, after being fixed to the brackets, it forces one or more teeth towards a desired position or "target position".

Preferably, the archwire is bent by machine, preferably at a temperature of more than 400° C., which permits a high level of precision and of dimensional stability.

Preferably, the shape of the archwire is determined in such a way as to minimize the number and the complexity of the bends. The bending machines normally used for producing mechanically active orthodontic archwires in lingual orthodontics may be used here. The use of a bending machine advantageously permits a very high level of precision in the shaping of the archwire. Methods for digital design and manufacture of brackets are described in FR 2 952 803, for example.

A conventional elastic archwire has only one stable shape, namely the shape at rest when it is exposed only to the corresponding forces of gravity and of reaction. It has the shape at rest, for example, when it is placed on the orthodontist's tray, before being fixed to the user's teeth. Such an archwire tends to return rapidly to its shape at rest, traditionally in less than a second, regardless of the elastic deformation applied. This tendency to return to the shape at rest increases the more the geometry of the archwire moves away from the shape at rest.

According to the invention, the archwire may adopt one or more stable shapes different than the shape at rest. Several techniques are possible for this purpose.

For example, the archwire may comprise one or more strands and/or several portions which are each able to adopt several stable configurations, for example two stable configurations, in the manner of a bistable leaf (for clarity, the terms "configuration" and "shape" have been reserved for the strands and for the archwire, respectively, but they must be considered as equivalents). If the archwire has three such strands configurable in first and second stable configurations, the force that it will exert on the teeth will depend on the number of these strands that have the first stable configuration. The degrees of stiffness of each strand may be identical or different. With three strands each having two stable configurations, the archwire will thus be able to adopt eight stable shapes.

These stable shapes are programmed in the archwire. In particular, the strands are adapted such that the stable shapes correspond to different periods of the treatment and/or to predetermined positions of the teeth. In other words, at the moment when the archwire is fitted in the position of use, the possible stable shapes are known and are limited in number. This programming of the archwire thus makes the treatment easier to carry out. At the desired moment, the user or the orthodontist simply has to apply the stimulus in order to adapt the treatment.

The change of stable configuration of a strand may result from a mechanical action exerted on the strand by the user or the orthodontist. The mechanical action may also result from a movement of a tooth under the effect of the appliance or from the deformation of another strand, which advantageously avoids an intervention on the part of the user or the orthodontist.

The change of stable configuration of a strand may also result from a modification of temperature, provided that the change is irreversible and that the return to the initial temperature does not cause a return to the initial stable configuration.

The archwire may also comprise several strands or several portions made of different materials. In particular, one strand may exert a force on the teeth only starting from a specific shape of the archwire, which shape will itself be obtained gradually by the action of another strand. The actions of the strands may thus complement each other in order to ensure that a time profile of the force exerted on the teeth is adapted to the requirements.

In one embodiment, the shape of the archwire may be modified by application of a magnetic or electric field, provided that the change of stable shape is irreversible without application of a new stimulus. Preferably, the application of the stimulus makes it possible to pass a threshold beyond which the archwire tends to deform in order to attain the following stable shape.

Of course, the archwire may be of a heterogeneous composition and/or structure, such that its different regions react differently to the same stimulus or react to different stimuli. In particular, along its length, the archwire may have a variable composition and/or transverse profile and/or number of strands and/or strands of variable composition and/or transverse profile. The transverse profile may in particular have a variable contour and/or variable dimensions. The transverse profile may also retain its shape but have an orientation that is variable along the length of the archwire.

The composition may also be variable along the width and/or the thickness of the archwire.

Composite Element, in Particular for Active Aligners

Materials with controlled deformation, that is to say of which the general shape and/or the volume may be modified in a controlled manner, may be used to produce an active orthodontic appliance according to the invention, and in particular an active aligner according to the invention.

The principle of controlled deformation may in particular be based on a composite structure as illustrated in FIGS. 1a and 1b. The element, for example an active aligner, may have a first and second regions made of first and second materials that have different behaviour, for example a second material that is hard and static, acting like a skeleton, and a first material that is deformable under the effect of a stimulus.

In the preferred embodiment, the first and second materials are such that their shape and/or their volume are modified differently when they receive the same stimulus. In particular, the second material may keep its shape and volume, whereas the shape and/or volume of the first material is modified by the stimulus.

Preferably, the first and second materials are fixed one on the other so that the change of the first material is at least partially hindered by the second material. The second material therefore controls the change of shape, i.e. the deformation of the composite structure.

In the preferred embodiment, the first material is an expansible material, and in particular a "swellable" material, i.e. the volume of which may increase when the material is put into contact with a solvent.

The first material is preferably a polymer.

It may be hydrophilic or hydrophobic.

It may be a hydrogel.

The polyethylene glycol diacrylate (PEG-DA) hydrogels described by L. A. Hockaday et al. in the article "Rapid 3D printing of anatomically accurate and mechanically heterogeneous aortic valve hydrogel scaffolds" by L. A. Hockaday et al., 2012 *Biofabrication* 4 035005 are examples of biocompatible materials that are printable in 3D.

The second material is preferably biocompatible.

The second material is preferably a photopolymerizable resin, preferably Orthocryl®, sold by DENTAURUM GmbH & Co. KG, and/or Transbond™, sold by 3M, and/or a metal, preferably a 3D printable metal.

Advantageously, these materials are adapted for orthodontic and dental appliances.

The desired deformation may be obtained by conforming said regions in an appropriate manner. Barrier layers may also be provided in order to control the effect of the stimulus. The first and/or second materials may have the shape of successive layers, each layer having preferably a thickness of less than 5 mm, preferably of less than 4 mm, preferably of less than 3 mm, preferably of less than 2 mm, preferably less than 1 mm, preferably less than 0.5 mm.

The first and second materials are preferably 3D printed, one on the other.

In the preferred embodiment where the element is in a retractable or expansible material, the shape and/or volume is to be changed with time, in particular when the material is retractable or expansible when it is in contact with saliva. In this preferred embodiment, 3D-priniting is also called "4D printing".

In an embodiment, a first 3D-printable material that swells in solvent was used.

In this embodiment, a metal, preferably a 3D printable metal, or a UV curable biocompatible polymeric material (second material) is used in combination with a hydrogel (first material) to create a bi-metal-like effect which creates transformation due to swelling through water absorption. The hydrogel is printed in precise locations causing the swelling and a precise transformation of the second material. If the hydrogel is printed on top of the other polymer, the swelling will be induced on the top which will cause the surface to curl such that the larger diameter is on top (hydrogel) and the smaller diameter is on the bottom (second material). Conversely, if the hydrogel is printed on the bottom and the second material is printed on the top, the surface will curl with the larger diameter on the bottom (hydrogel) and the smaller diameter on the top (second material).

The curling motion, when constrained to a neighboring tooth may therefore push or pull a tooth, depending on which side the hydrogel is placed.

All thermosetting polymers and some semi-crystalline polymers display the illustrated behavior when placed in a compatible solvent.

In one embodiment, as represented in FIGS. 1a and 1b, the arrangement of the first and second materials is determined so that the expansion or retraction of the region in the first material 22 does not substantially deform the region in the second material 20. In particular, the part of the appliance which is made of the second material, preferably having the general shape of a bar 18, is preferably fixed to teeth neighboring the tooth to be moved, so that the first material pushes the tooth to be moved as it expands or retracts.

FIGS. 1a and 1b shows an example of a composite element 15, in which a second region in the form of a T-shaped profile made of an acrylic polymer such as VeroBlack, and two first regions 22 and 22' made of a first, expansible polymer, for example a polymer that is expansible under the effect of a stimulus, for example the presence of a reagent.

FIG. 1a shows an example of a composite element 15, in which a second region in the form of a T-shaped profile made of an acrylic polymer such as VeroBlack, and two first regions 22 and 22' made of a first, expansible polymer, for example a polymer that is expansible under the effect of a stimulus, for example the presence of a reagent.

Collagen or agar, for example, are expansible in the presence of water and may constitute a first material. To control this expansion in a moist environment like the mouth, it is possible to protect the expansible material with a barrier layer, for example a layer of polytetrafluoroethylene and/or polyurethane and/or Dacron, as described in WO 02/05731 A1, for example. By determining the thickness and the open porosity of this barrier layer, it is possible to control the dynamic of expansion of the expansible material. A succession of layers of the first material and of barrier layers is also possible.

The two materials are arranged in such a way that, following the application of the stimulus, the second material forces the expansion of the first material in defined directions.

The Cyborg software tool from Autodesk or the VoxCAD software tool may be used in particular to model and simulate the behaviour of the materials.

Based on this principle, the element may be programmed to adopt a precise stable shape.

It thus becomes possible to program the shape of an element as a function of applicable stimuli, in particular in order to follow the development of the forces that the orthodontist wishes to apply to the teeth.

When the element is an active aligner, the action of the aligner may thus develop under the action of the stimulus, for example by progressive moistening of the aligner.

FIG. 6 illustrate another advantageous embodiment with a composite element.

In this embodiment, the element has the general shape of a long arch, preferably a ribbon, preferably with the general shape of a horseshoe. The length of said element is preferably greater than 1 cm, preferably greater than 2 cm, preferably greater than 3 cm, preferably greater than 4 cm, preferably greater than 5 cm, preferably greater than 10 cm, preferably greater than 15 cm, or even greater 20 cm, and/or less than 25 cm.

The width of said element is preferably greater than 2 mm, preferably greater than 3 mm, preferably greater than 4 mm, preferably greater than 5 mm, and/or less than 10 mm, less than 8 mm.

Preferably, the element is designed to be fixed on the inside faces of the teeth, preferably exclusively on the inside faces of the teeth, so as to be normally invisible in the service position, i.e. once the appliance has been fixed on the teeth, as represented.

The element preferably comprises a first region 22 in a retractable or expansible material, hatched in the figure, and a second region in a second material 20, represented with a plain black coloured zone.

In the preferred embodiment, the element comprises at least two first regions, preferably arranged so that, in the service position, they are located on each side of the tooth T to move, as represented in FIG. 6.

The element comprises bonding surfaces 42 which are matching the surface of the teeth. To this end, a 3D model of the arcade of the patient is created, so as to define the shape of the surface of the teeth. The element is thereafter manufactured accordingly, preferably by 3D printing.

The element preferably comprises more than 2, more than 3, more than 4, more than 5, or more than 7 bonding surfaces 42. The element represented in the figure comprises seven bonding zones, so that the element is efficiently adhering on the teeth.

Preferably, the bonding regions are defined on regions of the element made in the second material.

Preferably, a bonding surface, preferably each bonding surface has an area greater than 1 mm$^2$, preferably greater than 2 mm$^2$, preferably greater than 3 mm$^2$, and/or less than 10 mm$^2$.

Preferably, the element is fixed to neighbouring teeth N, preferably adjacent to the tooth to be moved.

Figure 7:
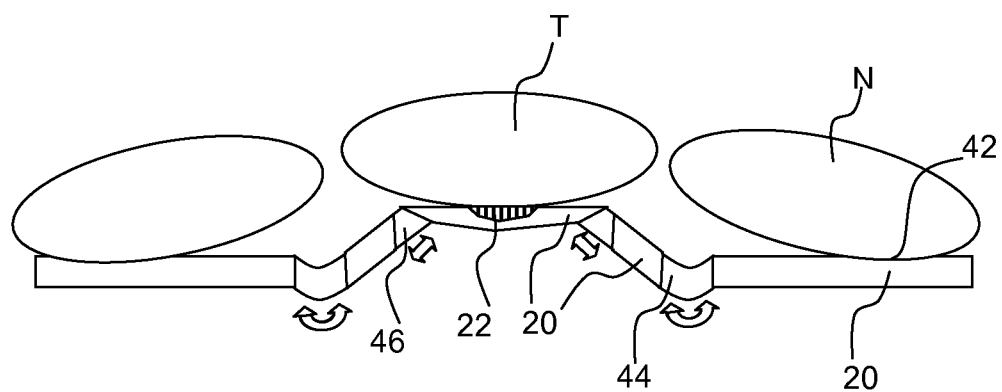

In a preferred embodiment, the second material is substantially rigid (i.e. will keep its shape in use). It will guide the forces generated by the deformation of the first material. In one embodiment, as represented in FIG. 7, the element comprises deformable regions, in particular between regions comprising a bonding surface.

The deformable regions may in particular be hinging regions 44, which may bend under the action of the forces generated in the service position, and/or extendable regions 46, the length of which may increase under the action of the forces generated in the service position.

The deformable regions may result from the choice of a material, for instance a polymer, having the required deformation properties.

The deformable regions may result from the choice of a shape. For instance, the element may comprise a support presenting weak regions, for instance made locally thinner, or presenting meanders, so that it may extend.

The support may be made in the second material.

Preferably, the first material 22 is only supported by second regions 20 in the second material.

Method of Production

Preferably, at least one part of the appliance, in particular at least the element, is designed and produced by computer.

An appliance according to the invention may be produced according to steps a) and c) described above.

In step a), measurements may be taken in a known manner on a plaster model of the dental arches of the user or directly in his or her mouth. Preferably, the measurements are carried out electronically, for example with measuring appliances of the type using an optical laser.

The measurements may be carried out with in-the-mouth or external imaging.

A professional appliance, for example a 3D optical scanner, preferably used by a healthcare professional, for example by an orthodontist, or by an orthodontics laboratory, permits the production of digital models on the basis of these measurements. Such measuring appliances make it possible to obtain digital models providing information on the positioning of the teeth with an error of less than 5/10 mm, preferably less than 3/10 mm, preferably less than 1/10 mm.

Preferably, the digital models are three-dimensional models of the dentition, for example of the type .stl or .Obj, .DXF 3D, IGES, STEP, VDA or point clouds. Advantageously, such "3D" models may be observed at any desired angle.

Digital models may be determined in order to model and simulate the positioning of the teeth at different stages of the treatment, in particular at the start and at the end of the treatment but also, for each element, at the start and end of the use of the element. Such modelling is well known to a person skilled in the art.

Preferably, the computer also determines at least one intermediate position of the teeth, between the initial and final positions.

For an appliance with brackets, the digital models may also be used to calculate the position and shape of the seats for fixing the archwire on the brackets.

In step b), the treatment to be carried out is determined, which preferably entails determining stable shapes that the element should adopt in the absence of forces (other than gravity and corresponding reaction) in order for the treatment to be effective.

The behaviour of an appliance according to the invention may be forecast by simulation, with a software tool.

With the software tool, the orthodontist designs the appliance specifically for the user's desired treatment. Preferably, the software tool allows the orthodontist to select different mechanisms for transformation (push, pull, rotate, translate) and simulate the various forces to arrive at the desired mouth configuration.

Such mechanisms using an appliance made of a composite element comprising a first layer of a first material, preferably a hydrogel, and a second layer of a second material, preferably a solid polymer, preferably a resin, lying on the first layer, are described hereafter. This description is not limiting the scope of the invention.

In step c), an element is produced accordingly. In particular, the element may be programmed to have a first stable shape, which is the shape at rest, and towards which the element will tend to deform during use, the first stable shape serving as a target shape during a first period of treatment so that the teeth attain an intermediate position, and a second stable shape, which is different than the first stable shape and is determined to serve as a target shape during a second period of the treatment, for example starting from the time when the teeth are arranged in the intermediate position.

During its fixing to the user's teeth, the element is deformed and reacts by exerting a force on the teeth. If the element is fixed when it is initially in the rest position, this force tends to return it to its shape at rest, as is the case with conventional archwires. During the first period of treatment, the shape at rest constitutes the target shape, that is to say the first stable shape towards which the element tends to deform.

According to the invention, the element is programmed in such a way as to have a second stable shape different than the initial position at rest. If, after it has been fixed to the teeth, the element receives a stimulus capable of rendering the second stable shape operational, it will tend to be brought back to this second stable shape. The second stable shape thus constitutes the target shape for a second period of the treatment.

The element may be programmed in such a way that this tendency to deform towards the target shape is exploited in order to force the teeth to move towards a desired position. The possibility of changing the target shape thus makes it possible to better control this movement.

The element may adopt several stable shapes and, during the treatment, the stable shape serving as target shape is modified. The difference between the target shape and the instantaneous shape of the element may thus be advantageously limited, which limits the forces exerted on the teeth and, consequently, the risks of hyalinization.

In addition, the target shape is programmable as a function of the profile of the forces that the orthodontist wishes to apply during the treatment.

The term "residual movement" $\delta_f$ signifies the movement that a point of a tooth still has to make from a "current" position, at any given time t of the treatment, to the final position, corresponding to the end of the treatment. The term "inactivation movement" $\delta_i$ signifies the movement that said point has to make from the current position to the target position at the time t. Preferably, regardless of the current position in question, the ratio $R=\delta_i/\delta_f$ is less than 50%, 20%, 15%, 10%, 5% or 2%. Therefore, in contrast to conventional appliances, in which the target position is always the final position and where the ratio $\delta_i/\delta_f$ is therefore always about 100%, the force exerted on the point of the tooth may, at least during part of the treatment, correspond only to a fraction of the force that is required to move this point to its final position. The risks of hyalinization are thereby reduced.

These preferences concerning the ratio R are preferably applicable irrespective of the particular point of the tooth, and preferably irrespective of the particular tooth from the set of teeth of the user.

FIGS. 2a to 2c are schematic illustrations of different profiles of the forces during treatment with an element for moving the teeth.

With an element according to the prior art for moving the teeth, the force σ decreases throughout the treatment with the element (curve 2a).

The curve 2b illustrates a profile with an element of an appliance according to the invention having a first stable shape. At the start of the treatment, the target shape is the first stable shape. At the time $t_s$, a stimulus makes it possible to modify the target shape, as has been explained above. The force σ on the teeth increases again.

The curve 2b illustrates a situation in which this new target shape is substantially the shape corresponding to the final positioning. It will be noted that the appliance according to the invention provides greater efficacy by keeping the force exerted on the teeth at a more constant level. The lifetime of the element is thus extended.

The element 30 shown in FIG. 3 could permit a force curve according to the curve 2b. The element 30 may adopt first and second stable shapes, labelled fs1 and fs2 respectively, the second stable shape being shown by broken lines. Up to the time $t_s$, the target shape is the first stable shape. After the time $t_s$, the target shape is the second stable shape.

The curve 2c illustrates a profile with an element having five stable shapes. At each time a new target shape is programmed. By limiting the magnitude of the force exerted on the teeth, an appliance according to the invention advantageously affords greater comfort for the user.

In the preferred embodiment, the appliance is a composite device which comprises, or even is constituted by a composite element comprising first and second materials with different properties, as described previously. The first material is preferably chosen so that, in the environment of the mouth, it deforms itself, preferably it swells, during a period greater than 1 week, preferably greater than 2 weeks, preferably greater than 4 weeks, preferably greater than 8 weeks, preferably greater than 12 weeks. The first material is preferably a hydrogel.

The number of stable shapes may therefore be infinite.

The element is preferably a self-transformable element, i.e. an element which, in the environment of the mouth, has a shape and/or a volume which varies, the transformation of the element being stopped if it is extracted from the mouth. Put differently, the environment of the mouth provides stimuli, preferably in a continuous way, which change the operational stable shape of the element.

The period during which the element is self-transformable, i.e. has a shape and/or a volume which varies, is preferably greater than 1 week, preferably greater than 2 weeks, preferably greater than 4 weeks, preferably greater than 8 weeks, preferably greater than 12 weeks.

For instance, a hydrogel (and therefore the composite element if the element only comprises two materials and if the second material is not deformable due to the environment of the mouth) will stop its swelling when it is not submitted anymore to the moisture of the mouth. Therefore, the operational stable shape of the element will be maintained, whereas, in the moist, the operational stable shape will continuously evolve until the hydrogel is saturated with water.

This is very different than a shape memory material, which has usually only one memorized shape.

The element is preferably programmed so that it has an infinite number of stable shapes, and preferably so that an infinite number of stable shapes are made operational, preferably as a result of its localisation inside a mouth of a user, and in particular as a result of its moistening, over a period greater than 1 week, preferably greater than 2 weeks, preferably greater than 4 weeks, preferably greater than 8 weeks, preferably greater than 12 weeks.

3D printing is a technology that is well suited to the production of a programmed element, preferably a monobloc element, or even an appliance having such an element.

3D printing may in particular be used to produce an active aligner with programmed deformation according to the invention, but also for a fixed appliance, and in particular for an archwire, or even for the brackets.

Existing printing technology are well-adapted. In particular, UV curable resins and hydrogels can be easily printed with light-based printing processes.

A multi-material printer, such as the Connex 500 from Stratasys, is preferred to manufacture composite elements, in particular comprising regions made of first and second materials, in particular layers made of first and second materials, as described previously.

A multi-material polyjet printing process may also be utilized, similar to the Stratasys Connex Multi-Material printers.

The expansible or retractable materials, in particular the materials cited above, may also be used, for example, to form a jack as shown in FIG. 4.

As is shown in this figure, such a jack traditionally has a cylinder 31 in which a piston 32 is mounted slidable. The chamber defined by the cylinder 31 and the piston 32 may contain an expansible or retractable material 34, which may be activated by a stimulus, preferably by irradiation, in particular by irradiation of visible or invisible light or by electromagnetic radiation.

In the embodiment of FIG. 5, the chamber may contain a plurality of expansible or retractable materials 34 of which the expansion or retraction is preferably controlled by means of different stimuli, for example by means of irradiation at different frequencies. For example, starting from a recessed initial position, the piston 32 may thus emerge gradually from the cylinder 31 by successive application of the different stimuli. In a first stage, a first irradiation may, for example, lead to the expansion of the material $34_1$. In a second stage, a second irradiation may lead to an expansion of the second material $34_2$, etc. A jack of this kind may in particular be used advantageously for removable expansion appliances. Advantageously, it allows several predetermined stable shapes to be obtained without screwing. The different positions of the jack thus allow the appliance to adopt corresponding geometries and therefore, during use, permit adaptation of the appliance according to the force that is to be exerted on the teeth.

At the end of step c), if necessary, the element is joined to the other parts constituting the orthodontic appliance. In particular, if the element is an archwire, this archwire is joined to the brackets.

Treatment Method

An orthodontic treatment by means of an appliance according to the invention is similar to a conventional orthodontic treatment.

Using an appliance with brackets, the orthodontist fixes the orthodontic brackets to several of the user's teeth, in particular by adhesive bonding, then fixes a programmed archwire according to the invention onto said brackets in such a way as to exert a force, preferably a permanent force, on said teeth during a period of treatment with said archwire, said force tending to position said teeth towards a target position.

In one embodiment, the archwire is programmed such that the target position is modified during said period of treatment with said archwire, without modifying the points of attachment of the archwire on the brackets, and in particular without readjusting the tensioning of the archwire.

During said period of treatment with said element, the forces are thus modified, in particular the amplitudes and/or directions thereof, without even partial loosening of the element, by virtue of the presence of several stable shapes that correspond to different target positions.

The same applies to an active aligner according to the invention.

Preferably, the element is able to be configured with a multiplicity of stable shapes, which correspond to the same number of target positions.

More preferably, the application of a suitable stimulus to the element makes it possible to render one stable shape non-operational in order to render the following one operational.

The application of the stimulus, after fixation to the brackets or placement on the teeth, thus makes it possible to change the target position.

Preferably, the stimulus is "Boolean", that is to say its application is all or nothing. In particular, there is no development in the intensity of the stimulus. Preferably, the nature of the stimulus is determined before the start of the treatment. Advantageously, no particular skill is required to apply the stimulus.

Depending in particular on its nature, the stimulus may be applied by the orthodontist or by the user. For example, in one embodiment, after a certain period of use, the user may place the active aligner in a bath of reagent in such a way as to obtain a new stable shape. Different baths may be provided in order to obtain several different stable shapes. In another embodiment, the orthodontist may have means for irradiating the element with a particular radiation, which leads to a new stable shape being rendered operational.

The stimulus is preferably applied when the appliance is in the position of use.

In one embodiment, the stimulus may involve applying a force or a vibration to the element. Preferably, however, the stimulus is applied without application of a force, preferably without contact with the element. To apply the stimulus, it is then not necessary to interact directly with the element, as is the case for example for modifying the position of a screw of a removable expansion appliance.

The period of treatment using the same element is typically more than one month, preferably more than two months.

The greater the number of programmed stable positions, the more numerous will be the possibilities for modifying the action of the appliance. This action will thus be better controlled.

In a preferred embodiment, the programming of the element is the result of a simulation of the evolution of a treatment. Typically, starting from a digital model of the teeth, the orthodontist anticipates the positioning of the teeth at different steps of the treatment and then programmes the appliance accordingly. At each of said steps, it then suffices to apply the stimulus that is needed to render operational the stable shape corresponding to the expected position of the teeth at the following step. Advantageously, the adaptation of the appliance is therefore simple and quick and corresponds precisely to what was initially intended.

As will be clear now, the invention makes available an orthodontic appliance whose action is precisely controllable, thus limiting the risks of error. This control, resulting from a "programming" of the element, makes it possible to extend the lifetime of the element and thus limit the number of visits to the orthodontist. It also makes it possible to limit the extent of the force exerted on the teeth, without thereby reducing the efficacy of the element. It thus considerably limits the risks of hyalinization. Finally, it permits rapid adaptation of the treatment.

Of course, the invention is not limited to the embodiments described, which have been given by way of non-limiting illustrations. All the possible combinations of these different embodiments are envisioned in particular.

In particular, the appliance may be constituted by the element, in particular by a composite element. But the invention is not limited to such appliances.

Moreover, the user is not limited to a human being. In particular, an appliance according to the invention may be used for another animal.

The stable shapes may correspond to steps of a therapeutic treatment. In one embodiment, a stable shape corresponds to an inactivation of the orthodontic appliance. For example, the orthodontic appliance may be programmed to be inactivated, that is to say have no effect on the teeth, when, for example after an impact, the orthodontic appliance has deformed in a particular way, for example has come partially loose from the teeth. This avoids a situation where the appliance, if fixed poorly on the teeth, acts unsuitably on the teeth.

The invention claimed is:

1. An orthodontic appliance configured for securing to a user's teeth during an orthodontic treatment, the appliance comprising an element comprising a first region in a first material, the first material being chosen so as to expand or retract, when it is in contact with a liquid, from a first stable shape to a second stable shape, the element also comprising a second region in a second material, the second material being chosen so as to expand or retract less than the first material when it is in contact with said liquid, the second region arranged so that the expansion or retraction of the first material is hindered by the second material, said first and second stable shapes constituting target shapes, the element being adapted so that its shape tends to return to said first and second stable shapes, so that, during first and second predetermined periods of said orthodontic treatment during which the orthodontic appliance is secured on the teeth, respectively, said element acts on the teeth to cause predetermined movements of the teeth, to reach predetermined first and second positions of the teeth, respectively, the first predetermined position extending until the contact with the liquid, the predetermined second period extending after the contact with the liquid, and wherein the target shapes correspond to the first and second positions of the teeth during the orthodontic treatment wherein, when referring to the first and second materials, expand means increasing in volume of each respective material.

2. The orthodontic appliance according to claim 1, in which the first material is a hydrogel.

3. The orthodontic appliance according to claim 1, in which the second material is a polymer.

4. The orthodontic appliance according to claim 1, in which the first region and/or the second region are in the form of layers, the thickness of the first and/or second layer being less than 2 mm.

5. The orthodontic appliance according to claim 1, having a shape of an arch designed to be fixed on more than 2, more than 3, or more than 4 teeth.

6. The orthodontic appliance according to claim 1, in which the first region is located so as to extend once the orthodontic appliance has been fixed on the teeth between two adjacent teeth.

7. The orthodontic appliance according to claim 1, comprising a bonding surface defined in the second region made of said second material.

8. The orthodontic appliance according to claim 7, in which said bonding surface matches a surface of a tooth.

9. The orthodontic appliance according to claim 1, in which the second material is rigid in use.

10. The orthodontic appliance according to claim 1, said appliance comprising a plurality of said first regions and a plurality of said second regions in said second material, the second regions and the first regions extending successively along a longitudinal axis of the orthodontic appliance, the second regions being separated by deformable regions, any deformable region being hinging region and/or one of said first regions.

11. The orthodontic appliance according to claim 1, wherein the appliance comprises at least one of a removable expansion appliance, a fan-type expansion appliance, a functional appliance for forward movement of the lower jaw, a nocturnal lingual envelope, an orthosis for forward movement of the lower jaw, an active or passive retainer appliance and an active aligner.

12. The orthodontic appliance according to claim 1, said appliance intended to be secured to a user's teeth in order to carry out the orthodontic treatment, said appliance being produced by a method having the following steps:
    a) gathering information relating to said set of teeth;
    b) using said information to determine the at least first and second stable shapes of said element towards which the element should tend to deform during the first and second periods of the treatment, respectively, the stable shape towards which said element tends to deform at a given time is operational;
    c) producing and programming said element in such a way that the contact with the liquid during the first period of the treatment renders said second stable shape operational.

13. The orthodontic appliance of claim 1, in which said element is monobloc.

14. The orthodontic appliance of claim 1, in which the element is configured so that, after a predetermined duration, the contact of the element with the liquid does not modify the shape of said element.

15. The orthodontic appliance of claim 1, in which the element is designed in such a way that its deformation for attaining said second stable shape continues after contact with said liquid until said second stable position.

16. The orthodontic appliance of claim 1, in which the element is programmed to be configurable in more than 2 stable shapes and less than 20 stable shapes under the effect of said contact.

17. The orthodontic appliance of claim 1, in which the element is in the form of an active aligner or of an orthodontic arch or of a jack containing expansible or retractable material.

18. The orthodontic appliance of claim 1, in which the element is produced by 3D printing.

19. An orthodontic appliance configured for securing to a user's teeth, the appliance comprising an element comprising a first region in a first material, the first material being chosen so as to expand or retract, under the effect of a predetermined stimulus, the element also comprising a second region in a second material, the second material being chosen so as to expand or retract less than the first material under the effect of said stimulus, said element, while secured to the user's teeth, being configured to move said teeth from an initial position to a first predetermined position before the application of the predetermined stimulus and to move said teeth from said first predetermined position to a second predetermined position after the application of the stimulus, said element comprising bonding surfaces, defined in the second region, configured to fix said element on said user's teeth, the arrangement of the first and second materials being determined so that the expansion or retraction of the first region does not substantially deform the second region in which said bonding surfaces are defined, the element comprising bonding surfaces of said element matching a surface of the teeth, each of said bonding surfaces having an area greater than 1 mm$^2$ and less than 10 mm$^2$ and being adapted to be fixed on said user's teeth with glue, wherein, when referring to the first and second materials, expand means increasing in volume of each respective material.

20. The orthodontic appliance according to claim 19, intended to be secured to a user's teeth in order to carry out an orthodontic treatment, said appliance being produced by a method having the following steps:
   a) gathering information relating to said set of teeth;
   b) using said information to determine at least first and second stable shapes of said element towards which the element should tend to deform during first and second periods of the treatment corresponding to the first and second predetermined positions, respectively, the stable shape towards which said element tends to deform at a given time being called "operational"
   c) producing and programming said element in such a way that the application of the predetermined stimulus during the first period of the treatment renders said second stable shape operational.

21. The orthodontic appliance according to claim 19, in which the first and second materials are deformable under the effect of the stimulus chosen from the group including vibration, radiation, a modification of the humidity and/or of the acidity and/or of the temperature and/or of the chemical composition of the environment of the element, application of an electric current and/or of an electric voltage and/or of a magnetic field, a force, a masticatory force, and combinations thereof.

22. The orthodontic appliance according to claim 19, in which the first and second materials are deformable under the effect of the stimulus that may be applied without contact.

23. The orthodontic appliance according to claim 19, in which the element is programmed to be configurable in more than 2 stable shapes and less than 20 stable shapes under the effect of said stimulus.

24. The orthodontic appliance according to claim 1, in which said first and second stable shapes correspond to steps of a therapeutic treatment or of a cosmetic treatment.

25. The orthodontic appliance according to claim 1, in which the element is made of a material that does not have shape memory.

* * * * *